United States Patent
Gill et al.

(10) Patent No.: US 9,645,557 B2
(45) Date of Patent: May 9, 2017

(54) GEOTHERMAL PROCESS OPTIMIZER

(71) Applicant: Ecolab USA Inc., Naperville, IL (US)

(72) Inventors: Jasbir S. Gill, Naperville, IL (US);
David Rodman, Townsville (AU);
Srinivasan Ramanathan, Pune (IN);
Tin Huynh, Perth (AU)

(73) Assignee: ECOLAB USA INC., Naperville, IL (US)

( * ) Notice: Subject to any disclaimer, the term of this patent is extended or adjusted under 35 U.S.C. 154(b) by 445 days.

(21) Appl. No.: 14/329,673

(22) Filed: Jul. 11, 2014

(65) Prior Publication Data

US 2016/0011570 A1    Jan. 14, 2016

(51) Int. Cl.
*G01N 31/00*   (2006.01)
*G05B 13/02*   (2006.01)
*F03G 7/04*    (2006.01)

(52) U.S. Cl.
CPC ............. *G05B 13/02* (2013.01); *F03G 7/04* (2013.01); *Y02E 10/10* (2013.01)

(58) Field of Classification Search
CPC ..... C02F 1/16; C02F 1/042; F03G 7/04; F24J 3/08; F28F 19/00
USPC .......................... 702/22, 30; 60/641.1, 641.5
See application file for complete search history.

(56) References Cited

U.S. PATENT DOCUMENTS

| | | | |
|---|---|---|---|
| 8,276,381 B2 * | 10/2012 | Weres | B01D 19/0036 60/641.1 |
| 2011/0187126 A1 | 8/2011 | Nakamura et al. | |
| 2011/0219769 A1 | 9/2011 | Weres | |
| 2012/0260655 A1 | 10/2012 | Kaplan et al. | |
| 2014/0075938 A1 | 3/2014 | Bronicki | |
| 2014/0165564 A1 | 6/2014 | Inoue et al. | |

FOREIGN PATENT DOCUMENTS

EP    2437206 A1    4/2012

OTHER PUBLICATIONS

Koenraad F. Beckers et al., Introducing Geographies V1.0: Software Package for Estimating Levelized Cost of Electricity and/or Heat from Enhanced Geothermal Systems, 8 pgs., Proceedings, Thirty-Eighth Workshop on Geothermal Reservoir Engineering Stanford University, Feb. 11-13, 2013.
International Search Report and Written Opinion from corresponding PCT Appln. No. PCT/US2015/039927 dated Sep. 25, 2015, 10 pages.

* cited by examiner

*Primary Examiner* — An Do
(74) *Attorney, Agent, or Firm* — Eric D. Babych; Brinks Gilson & Lione

(57) ABSTRACT

A system for geothermal process optimization can include a receiver configured to receive brine conditions sensed at a head of a production well of a geothermal power plant and a first circuit configured to determine an analyte value according to the sensed brine conditions. Also, the system can include a second circuit configured to determine a product dosage value for a product, according to the analyte value, product information, and historical power plant data. The product dosage value can be an amount of the product suggested to adequately prevent buildup, corrosion, or a combination thereof at a given part of the geothermal power plant, such as the production well.

8 Claims, 11 Drawing Sheets

Geomizer - Screen 1

Scenario    Tools    Help

Customer Information

Project Name

Customer Name

Location

Country

Analysis Performed by

Date of Analysis

Comments

Next >>

Geomizer - Screen 3

Scenario | Tools | Help

Production Well: Well 6

Steam Chemistry
| | |
|---|---|
| Ammonia | |
| Argon | mm/100mH2O |
| CO2 | mm/100mH2O |
| H2S | mm/100mH2O |
| Helium | mm/100mH2O |
| Hydrogen | mm/100mH2O |
| Methane | mm/100mH2O |
| Nitrogen | mm/100mH2O |
| Oxygen | mm/100mH2O |

Brine Chemistry
| | |
|---|---|
| Ammonia | mg/L |
| Bicarbonate | mg/L |
| Boron | mg/L |
| Calcium | mg/L |
| Chloride | mg/L |
| H2S | mg/L |
| Iron | mg/L |
| Lithium | mg/L |
| Magnesium | mg/L |
| Potassium | mg/L |
| Silica | mg/L |
| Sodium | mg/L |
| Sulphate | mg/L |
| CO2 | mg/L |
| Aluminum | mg/L |
| Fluoride | mg/L |
| TSS | mg/L |
| pH | |

Sample Details
| | |
|---|---|
| Well Flow rate | kg/s |
| Sample Temperature | C |
| Sample Pressure | bar |
| pH Measurement Temperature | |

Save | << Back | Next >>

GEOTHERMAL PROCESS OPTIMIZER

BACKGROUND

This application relates to a system for managing geothermal power plants.

Geothermal power plants use heat energy from the earth to produce electrical energy for power consumption. Geothermal heat energy can come from the earth's core continuously flowing outwards. In can be a practically endless resource of fuel. Water heated from the earth's core, in the form of hot water or steam, can be trapped under layers of impermeable rock. It is with this trapping of water or steam that geothermal reservoirs can form, for the use of geothermal power production.

To develop electricity from geothermal resources, wells are drilled into geothermal reservoirs. The wells bring the geothermal water or steam to the surface, where the heat energy stored in the water or steam is converted into electricity at a geothermal power plant. There are various types of geothermal power plants and each type may be configured in various ways to be compatible with the source of the geothermal energy reservoirs.

To maintain these types of power plants, various chemical products are used to control corrosion and buildup of various types of mineral and organic deposits within geothermal systems. Described herein is a system for optimizing the configuration of geothermal power plants and the use of products to reduce various types of buildup and corrosion.

BRIEF DESCRIPTION OF THE DRAWINGS

Systems described herein may be better understood with reference to the following drawings and description. Non-limiting and non-exhaustive examples are described with reference to the drawings. The components in the drawings are not necessarily to scale. In the drawings, like referenced numerals designate corresponding parts throughout the drawings.

FIG. 2 illustrates an example computer that can implement server-side aspects of geothermal power plant optimization.

FIG. 3 illustrates an example computer that can implement client-side aspects of geothermal power plant optimization.

FIGS. 5 and 6 illustrate example operations for determining and providing optimization information for a geothermal power plant.

FIGS. 7-11 illustrate example screens for determining and providing optimization information for a geothermal power plant.

DETAILED DESCRIPTION

Figure 1:
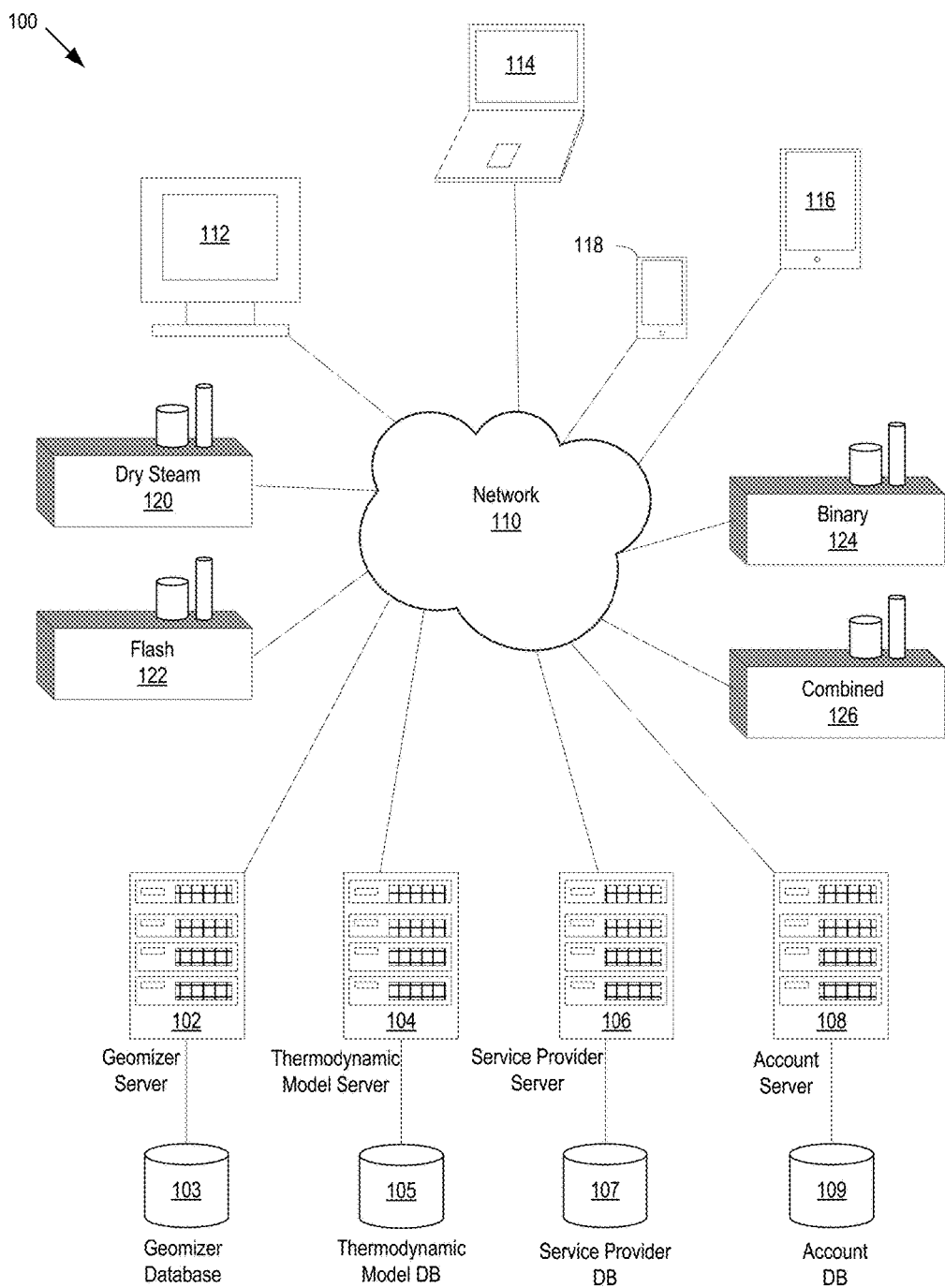
FIG. 1 illustrates a block diagram of an example computer network architecture 100 that includes example computers of a network that can provide geothermal power plant optimization information.

The systems will now be described more fully hereinafter with reference to the drawings, which show by way of illustration examples of the systems. The systems can be embodied in a variety of different forms, so covered or claimed subject matter is intended to be construed as not being limited to examples set forth herein; examples are provided merely to be illustrative. The systems may be embodied as methods, apparatuses, or non-transitory computer readable mediums. The following detailed description is not intended to be limiting on the scope of what is claimed.

Overview of Geothermal Process Optimizer

This application describes systems for optimizing and managing geothermal power plants. However, the systems described herein can be applied to other types of services, such as energy services including oil well and drilling services and mining. The systems can also be applied to various manufacturing processes, such as paper production processes.

The systems can be used for predicting corrosion, mineral scale formation, and organic buildup. The systems can also be used for inhibiting corrosion, mineral scale formation, and organic buildup by suggesting products and services, such as chemical products and treatment services. The systems can include a computer application (such as a web application implemented at least partially by one or more circuits) that is configured to model configurations and layouts of various geothermal power plants (such as plants utilizing one or more production wells, flash separation processes, binary heat exchangers, geyser or dry steam systems, reinjection wells, and any combination thereof). The computer application can also be configured to output information pertinent to corrosion, mineral buildup, and organic buildup within the plants and solutions for inhibiting the same. Further, models, such as thermodynamic models, used by the computer application, can evolve with use. Evolutions of the modeling can be stored by data storage devices communicatively coupled to the computer application.

In one example, brine compositions of one or more production wells can be determined, and such brine compositions can be used as input with thermodynamic models and respective power plant information to predict corrosion, mineral scale formation, organic buildup, and solutions for inhibiting the same. The composition analysis can be adapted for a single brine source and multiple brine sources. These predictions can be outputted in various ways, such as displayed on a touch screen, and can be used as a tool to assist in the selling of products and services for optimizing geothermal power plants. In such an example, optimization can be through the use of chemicals that inhibit corrosion and mineral scale formation (such as calcite, anhydrite, silica, fluorite, and other mineral scale formation) in a geothermal power plant. This process can also be applied to the inhibiting of organic material buildup in a geothermal power plant. The process can provide both product and dose suggestions.

The systems may include a geothermal product sales acceleration tool ("the geomizer"). The geomizer may include a tool served from a computer and used via a corresponding client-side application, such as a web browser. The geomizer can be implemented through computer hardware, software, or a combination thereof. The client-side application can be used by a sales representative to sell or inform geothermal power plant operators of chemicals and other types of solutions for optimizing their geothermal power plant.

In one example, a system for geothermal process optimization can include a receiver configured to receive brine conditions sensed at a head of a production well of a geothermal power plant and a first circuit configured to determine an analyte value according to the sensed brine conditions. Also, the system can include a second circuit configured to determine a product dosage value for a product, according to the analyte value, product information, and historical power plant data. The product dosage value can be an amount of the product suggested to adequately prevent buildup, corrosion, or a combination thereof at a given part of the geothermal power plant. For example, the product dosage value can be an amount of the product suggested to adequately prevent buildup, corrosion, or a combination thereof at the production well. The determination of the product dosage value can be according to historical power plant data, such as historical data corresponding to the give production well or other part of the geothermal power plant. The system can also include a circuit configured to output product dosage value to a display. This displaying of the dosage value can be proximate to a graphical representation of the given part of the geothermal power plant within a graphical representation of the plant as a whole.

In one example, a system for geothermal process optimization can be stored in a non-transitory computer readable medium executable by a processor. Such as system can include a receiver configured to receive brine conditions sensed at a head of a production well of a geothermal power plant. The system can also include an analyte calculator circuit communicatively coupled to the receiver. The analyte calculator circuit can be configured to determine an analyte value according to the sensed brine conditions. The system can also include a product dosage circuit communicatively coupled to the analyte calculator circuit. The product dosage circuit can be configured to determine a product dosage value for a product according the analyte value and product information. The product dosage value can be an amount of the product suggested to adequately prevent buildup, corrosion, or a combination thereof at the head of the production well. This determination of the product dosage value can be according to historical power plant data. The product dosage circuit can also be configured to output the product dosage value to a display.

In another example, the brine conditions can be first brine conditions, the head of the production well can be a first part of the power plant, the analyte value can be a first analyte value, and the product dosage value for the product can be a first product dosage value for a first product. In such an example, the receiver can be further configured to receive second brine conditions sensed at a second part of the power plant upstream of the head of the production well and receive power plant features of the power plant. The analyte calculator circuit can be further configured to determine a second analyte value according to one of the power plant features and the first analyte value, wherein the one feature of the power plant corresponds to the second part of the power plant. Further, the product dosage circuit can be configured to determine a second product dosage value for a second product according the second analyte value, the product information, and the historical power plant data. In such an example, the second product dosage value can be an amount of the second product suggested to adequately prevent buildup, corrosion, or a combination thereof. Also, the product dosage circuit can be configured to output the second product dosage value to the display. In this example, the production well can be a first production well, and the second part can be a head of a tank that mixes brine from the first production well and a second production well.

Also, in this example, the receiver can be further configured to receive third brine conditions sensed at a third part of the power plant upstream of the second part of the power plant. The analyte calculator circuit can be further configured to determine a third analyte value according to a second of the power plant features and the second analyte value, wherein the second feature corresponds to the third part of the power plant. The product dosage circuit can be further configured to determine a third product dosage value for a third product according the third analyte value, the product information, and the historical power plant data. The third product dosage value can be an amount of the third product suggested to adequately prevent buildup, corrosion, or a combination thereof at the third part of the power plant. Also, the product dosage circuit can be configured to output the third product dosage value to the display. The third part can be a head of an injection well, a head of a flash tank, a head of a geothermal fluid pipe in a binary system, or a head of a working fluid pipe in the binary system. Also, the first product, the second product, and the third product can be similar products or even the same product.

In this example and others, the brine conditions can include brine temperature, brine pressure, brine contents, or any combination thereof. Also, in this example and others, analyte values can be representative of concentrations of one or more minerals, molecules, organic materials, inorganic materials, or any combination thereof. The product can include a calcite inhibitor, an anhydrite inhibitor, a silica inhibitor, a fluorite inhibitor, any other type of mineral inhibitor, a biocide, a corrosion inhibitor (such as a basic corrosion inhibitor), or any combination thereof.

In yet another example, a system for geothermal process optimization can perform a method that optimizes a geothermal process by determining and suggesting products to add to the process. The method can include receiving, at a receiver, first and second brine conditions sensed at a respective first part and a respective second part of a geothermal power plant. The method can also include determining, at a first circuit, a first and a second analyte values according to the first and the second sensed brine conditions, respectively. The method can also include determining, at a second circuit, a first product dosage value for a first product according the first analyte value, product information, and historical power plant data, wherein the first product dosage value is an amount of the first product suggested to adequately prevent buildup, corrosion, or a combination thereof at the first part of the power plant. Also, the method can include determining, at the second circuit, a second product dosage value for a second product according the second analyte value, the product information, and the historical power plant data, wherein the second product dosage value is an amount of the second product suggested to adequately prevent buildup, corrosion, or a combination thereof at the second part of the power plant. The method can also include displaying, at a display device, the first and the second product dosage values along with graphical representations of the first and the second parts of the power plant.

In this last example, the first part of the power plant can be a head of a first production well and the second part can be a head of a second production well. Alternatively, the first part can be a head of a production well and the second part can be a head of a brine mixing tank, a head of a flash tank, a head of a geothermal fluid pipe in a binary system, or a head of a working fluid pipe in the binary system. Also, in this last example, the first product and the second product can be similar products or even the same product.

DESCRIPTION OF THE DRAWINGS

FIG. 1 illustrates a block diagram of an example computer network architecture 100 that includes example computers of a network that can provide geothermal power plant optimization information. The computer network architecture 100 in the example of FIG. 1 includes a geomizer server 102, a geomizer database 103, a thermodynamic model server 104, a thermodynamic model database 105, a service provider server 106, a service provider database 107, an account server 108, and an account database 109. The aforementioned servers and databases can be communicatively coupled over a network 110. The computer network architecture 100 may be accessible over the network 110 by end user devices (such as end user devices 112-118) and by computers associated with geothermal power plants (such as computers communicatively coupled to sensors installed within geothermal power plants 120-126).

The computer network architecture 100 may be implemented at least partially in a cloud-computing environment, at least partially in a server, at least partially in a client device, or in a combination thereof.

The geomizer server 102 stores geomizer information for analysis and management of geothermal power plant operations (such as operations within the geothermal power plants 120-126). Further, the geomizer server 102 can serve a server-side part of the geomizer.

The geomizer server 102 is in data communication with the geomizer database 103. Geomizer information may include database records associated with operating conditions and parameters of each respective geothermal power plant that it serves. Suitable information may be stored, maintained, updated and read from the geomizer database 103 by the geomizer server 102. Geomizer information can also include account information received from the account server 108, such as operator identification information, operator security information (e.g., passwords and other security credentials), and account balance information.

The geomizer server 102 may be implemented using a single server computer, a plurality of server computers, or other types of computing devices known in the art. Access to the account server 108 can be accomplished through a firewall that protects the geomizer and associated information from external tampering. Additional security may be provided via enhancements to the standard communications protocols, such as Secure HTTP (HTTPS) or the Secure Sockets Layer (SSL). Such security may be applied to any of the servers of FIG. 1, for example.

The geomizer server 102 may provide an operator front end to simplify the process of accessing the geomizer parameters and information. The operator front end of the geomizer may be a circuit, program, application, or software routine that forms a user interface. In a particular example, the operator front end is accessible as a website. Through the front end, the operator may add, view, and change geomizer parameters and information, generate reports based on such parameters and information, and store the parameters and information in the geomizer database 103. The front end may be presented to a user via multiple display screens, such as through the example screens illustrated in FIGS. 7-11. The geomizer related data may be viewed in real time using the operator front end. A script and/or applet may be a part of this front end and may render access points for retrieval of geomizer related data. The script and/or applet may be implemented via a circuit. In an example, this front end may include a graphical display of fields for selecting various aspects of geomizer related data. The front end, via the script and/or applet, can request the various aspects of geomizer related data. The information can then be displayed, such as displayed according to the script and/or applet. Such an operator front end may be applied to any of the servers of FIG. 1, for example.

In an example, the geomizer may include a tool served from the geomizer server 102 and used via a corresponding client-side application, such as a web browser. Such a client-side application may be render by any of the end user devices 112-118. The client-side application can be used by a sales representative to sell or inform geothermal power plant operators of chemicals and other types of solutions for optimizing their geothermal power plant. The geomizer can display an output of graphical elements that include components of a power plant in a visually pleasing layout. The geomizer can also display detailed pages per component of a plant, such as per production well or injection well. Also, a unit converter of the geomizer can allow for the display of data in various unit formats. Benefits of the geomizer are the ability to model and display geothermal power plant configurations, and predict and display scaling, organic buildup, and corrosion data in real time according to user selected power plant configurations. Such configurations can be selected via a user-friendly graphical user interface.

The geomizer can use existing thermodynamic models, received from the thermodynamic model server 104, to predict the solubility of salts and other types of substances under various geothermal operating conditions, including geothermal power plant conditions, such as binary plant conditions, flash conditions, direct or indirect condensation conditions, single and multiple stage flash conditions, and any plant conditions that include any combination thereof. The geomizer can use these models to determine the impact of blending multiple brine sources and useable blending of multiple brine sources, buildup and corrosion inhibitors, and inhibitor dose rates to prevent buildup and corrosion. The geomizer can also predict distribution of gaseous contaminants at variable pressures and temperatures and its impact on water chemistry in the brine.

Figure 2:
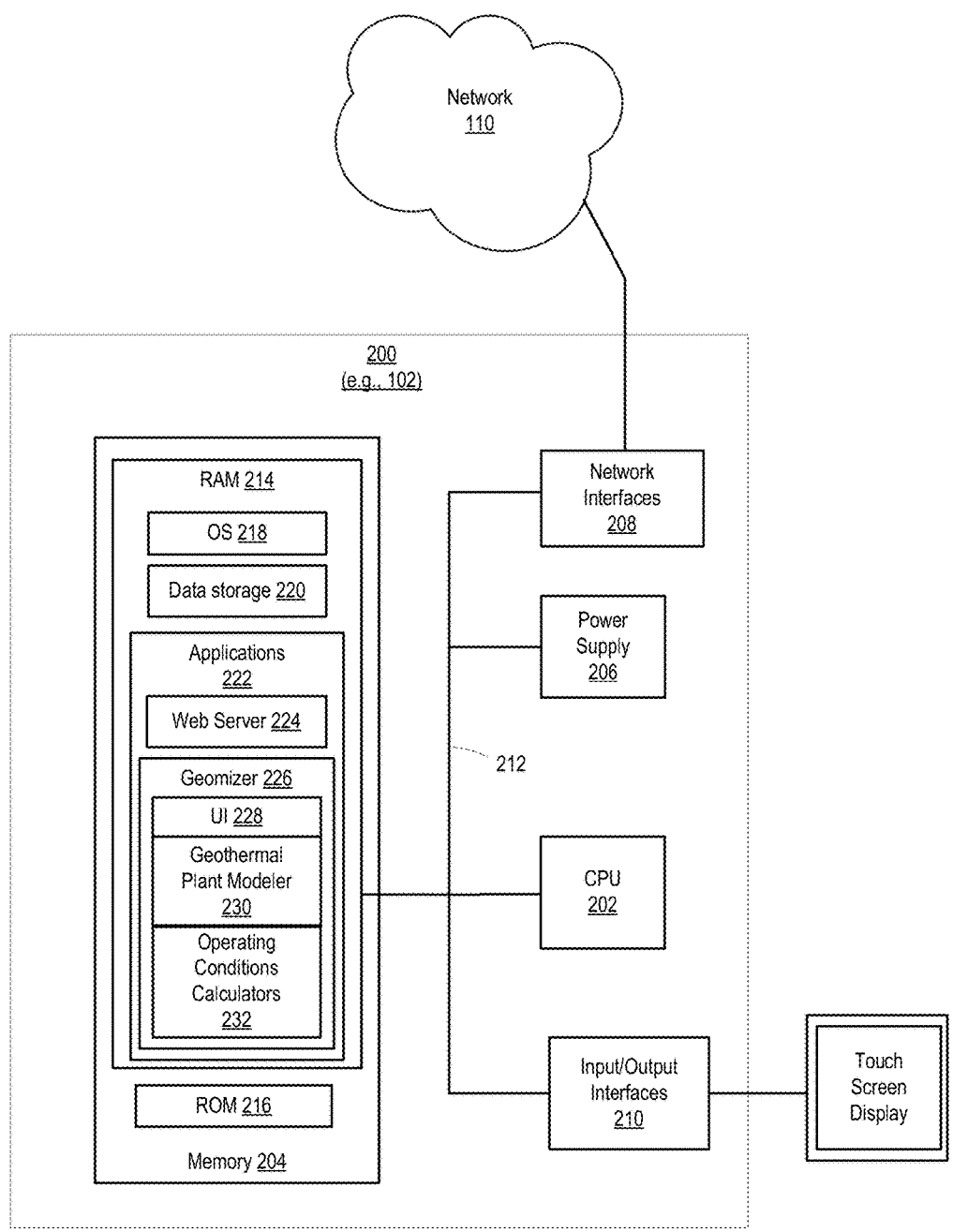
FIGS. 2 and 3 are block diagrams of example computers that can be used within the example computer network architecture 100 of FIG. 1.

FIG. 2 illustrates an example computer 200 that can implement the geomizer server 102 of FIG. 1. The computer 200 can include a central processing unit (CPU) 202, a memory circuit 204, a power supply circuit 206, and input/output circuits, such as network interfaces 208 and input/output interfaces 210, and a communication bus 212 that connects the aforementioned elements of the computer. The network interfaces 208 can include a receiver and a transmitter (or a transceiver), and an antenna for wireless communications. The CPU 202 can be any type of data processing device, such as a central processing unit (CPU). Also, for example, the CPU 202 can be central processing logic; central processing logic may include hardware (such as circuits and/or microprocessors), firmware, software and/or combinations of each to perform functions or actions, and/or to cause a function or action from another circuit of the computer 200. Also, central processing logic may include a software controlled microprocessor, discrete logic such as an application specific integrated circuit (ASIC), a programmable/programmed logic device, memory device containing instructions, a combinational logic embodied in hardware, or any combination thereof. Also, logic may also be fully embodied as software.

The memory circuit 204, which can include random access memory (RAM) 214 or read-only memory (ROM) 216, can be enabled by memory hardware, such as a primary (directly accessible by the CPU) and/or a secondary (indirectly accessible by the CPU) storage device (such as flash memory, magnetic disk, optical disk).

The RAM 214 can store data and instructions defining an operating system 218, data storage 220, and applications 222, including a web server 224 and a client-side application such as the geomizer 226. The geomizer 226 can include sub-applications such as a corresponding user interface 228, a geothermal plant modeler 230, and geothermal plant operations calculators 232. Each of these sub-applications may be implemented via circuits. The circuits may be combined with scripts and/or applets. The applications 222 and sub-applications may include hardware (such as circuits and/or microprocessors), firmware, software, or any combination thereof. Example information provided by an application, such as the geomizer 226, may include text, images, audio, video, or any combination thereof, which may be processed in the form of physical signals, such as electrical signals, for example, or may be stored in memory, as physical states.

The ROM 216 can include basic input/output system (BIOS) of the computer 200. The power supply 206 contains power components, and facilitates supply and management of power to the computer 200. The input/output circuits can include various types of interfaces for facilitating communication between components of the computer 200, components of external computers (such as components of other computers of the computer network architecture 100), and end users. For example, such circuits can include a network card that is an integration of a receiver, a transmitter, and I/O interfaces. The network interfaces 208 may include a network card. A network card, for example, can facilitate wired or wireless communication with other computers and network devices of a network. In cases of wireless communication, an antenna can facilitate such communication. The I/O components, such as I/O interfaces 210, can include user interfaces such as monitors, keyboards, touchscreens, microphones, and speakers.

The thermodynamic model server 104 stores and serves thermodynamic modeling information for analysis of geothermal power plant operations (such as operations within the geothermal power plants 120-126). The thermodynamic modeling information can include third party models, such as models used to calculate solubility product constants (K) and ion activity products (Q) for solutes in well chemistry. These calculations can be made according to real time production data and historical production data. Also, steam and brine chemistry distribution, concentration factor of the brine after a steam separator, temperature of the brine (above or below the surface) can be calculated according to various geothermometers. Also, the thermodynamic model server 104 can store and serve STEAM 97, which the geomizer can use to calculate thermodynamic and transport properties of water and steam. Information associated with the thermodynamic model server 104 may be stored in the thermodynamic model database 105.

The service provider server 106 stores service and product information for improving and maintaining power plant operations (such as operations within the geothermal power plants 120-126). The service and product information may include various services and products for inhibiting mineral scaling, organic buildup, and corrosion in parts of geothermal power plants, such as production and reinjection wells. Similar to the other servers described herein, various security measures and operator front ends may be adapted to work with the service provider server 106. Data associated with the service provider server 106 may be store in the service provider database 107.

The account server 108 stores account information for operators of geothermal power plants (such as the geothermal power plants 120-126). The account server 108 is in data communication with the account database 109. Account information may include database records associated with each respective operator of a geothermal power plant. Suitable information may be stored, maintained, updated and read from the account database 109 by the account server 108. Examples include operator identification information, operator security information, such as passwords and other security credentials, account balance information, and information related to operations of the operator's power plants.

Similar to the other servers described herein, the account server 108 may be implemented using a single server computer, a plurality of server computers, or other types of computing devices known in the art. Access to the account server 108 can be accomplished through a firewall that protects the account management programs and the account information from external tampering. Additional security may be provided via enhancements to the standard communications protocols, such as Secure HTTP (HTTPS) or the Secure Sockets Layer (SSL).

Similar to the other servers described herein, the account server 108 may provide an operator front end to simplify the process of accessing the information, such as account information of an operator. The operator may view and edit account data, and after editing the account data, the account data may then be saved to the account database 109. Account data may be viewed in real time using the operator front end.

The aforementioned servers and databases may be implemented through one or more computers. A computer may be capable of sending or receiving signals, such as via a wired or wireless network, or may be capable of processing or storing signals, such as in memory as physical memory states, and may operate as a server. One or more computers capable of operating as a server may include dedicated rack-mounted servers, desktop computers, laptop computers, integrated devices, and any combination thereof. Each server computer may include a central processing unit and memory. A server may also include a mass storage device, a power supply, wired and wireless network interfaces, input/output interfaces, and/or a computer operating system, such as Windows Server.

The aforementioned servers and databases may be part of online information systems or may be in communication with other online information systems. An online information system may include a computer that includes a configuration to provide data via a network to another computer, including in response to received requests for information. An online information system may host a website, such as a website of a service provider. An online information system may include a variety of services that may include web services, third-party services, audio services, video services, email services, instant messaging (IM) services, SMS services, MMS services, FTP services, voice over IP (VOIP) services, calendaring services, photo services, and any combination thereof. Examples of computers that may operate as an online information system include desktop computers, multiprocessor systems, microprocessor-type or programmable consumer electronics and any combination thereof.

Examples of information described herein, such as information managed in an online information system, may include text, images, audio, video, and any combination thereof, which may be processed in the form of physical signals, such as electrical signals, for example, or may be stored in memory, as physical states, as another example.

The processing and storage of information described herein may be implemented via one or more circuits, such as an electronic circuit.

The network 110 may include a data communication network or a combination of networks. A network may couple devices, such as computers of a computer network, so that communications may be exchanged, such as between a server and a client device or other types of devices, including between wireless devices coupled via a wireless network. The network 110 may include mass storage, such as a network attached storage (NAS), a storage area network (SAN), or other forms of computer or machine-readable media, for example. The network 110 may include the Internet, local area networks (LANs), wide area networks (WANs), wire-line type connections, wireless type connections, or any combination thereof.

Various types of computers and network devices may be made available to provide an interoperable capability for differing architectures, protocols, and computers described herein. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels.

Any of the end user devices 112-118 may include a central processing unit that may access any server or database of the computer network architecture 100 over the network 110. Any of the end user devices 112-118 may be operative to interact over the network 110 with any server or database of the computer network architecture 100. Any of the end user devices 112-118 may implement a client-side application for viewing electronic properties and submitting user requests, and may communicate data to any server or database of the computer network architecture 100, including data defining electronic properties and other information. Any of the end user devices 112-118 may receive communications from any server or database of the computer network architecture 100, including data defining electronic properties and geothermal power plant operations information. The aforementioned interactions and information may be logged in data logs and such logs may be communicated to an analytics server for processing, such as the geomizer server. Once processed into corresponding analytics data (such as geomizer data), such data can be input for determining products and solutions to maintain and improve geothermal power plant operations.

Any of the end user devices 112-118 may include a computing device, such as a computer, capable of sending or receiving signals, such as via a wired or a wireless network. A client device may include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, and any combination thereof. In FIG. 1, end user device 112 is a desktop computer, end user device 114 is a laptop computer, end user device 116 is a tablet computer, and end user device 118 is a smartphone.

Any of the end user devices 112-118 may vary in terms of capabilities or features. For example, a smartphone may include a physical or virtual keyboard, mass storage, an accelerometer, a gyroscope, global positioning system (GPS) or other location-identifying type capability, or a display with a high degree of functionality, such as a touch-sensitive color 2D or 3D display. Any of the end user devices 112-118 may include or may execute a variety of operating systems, including a personal computer operating system, such as a WINDOWS or a mobile operating system, such as ANDROID. A client device may include or may execute a variety of possible applications, such as a client software application enabling communication with other devices, such as communicating messages, such as via email, short message service (SMS), or multimedia message service (MMS), including via a network, such as a social network. A client device may also include or execute an application to communicate content, such as, for example, textual content, multimedia content, or the like. A client device may also include or execute an application to perform a variety of possible tasks, such as browsing, searching, playing various forms of information, including locally or remotely stored or streamed video.

Figure 3:
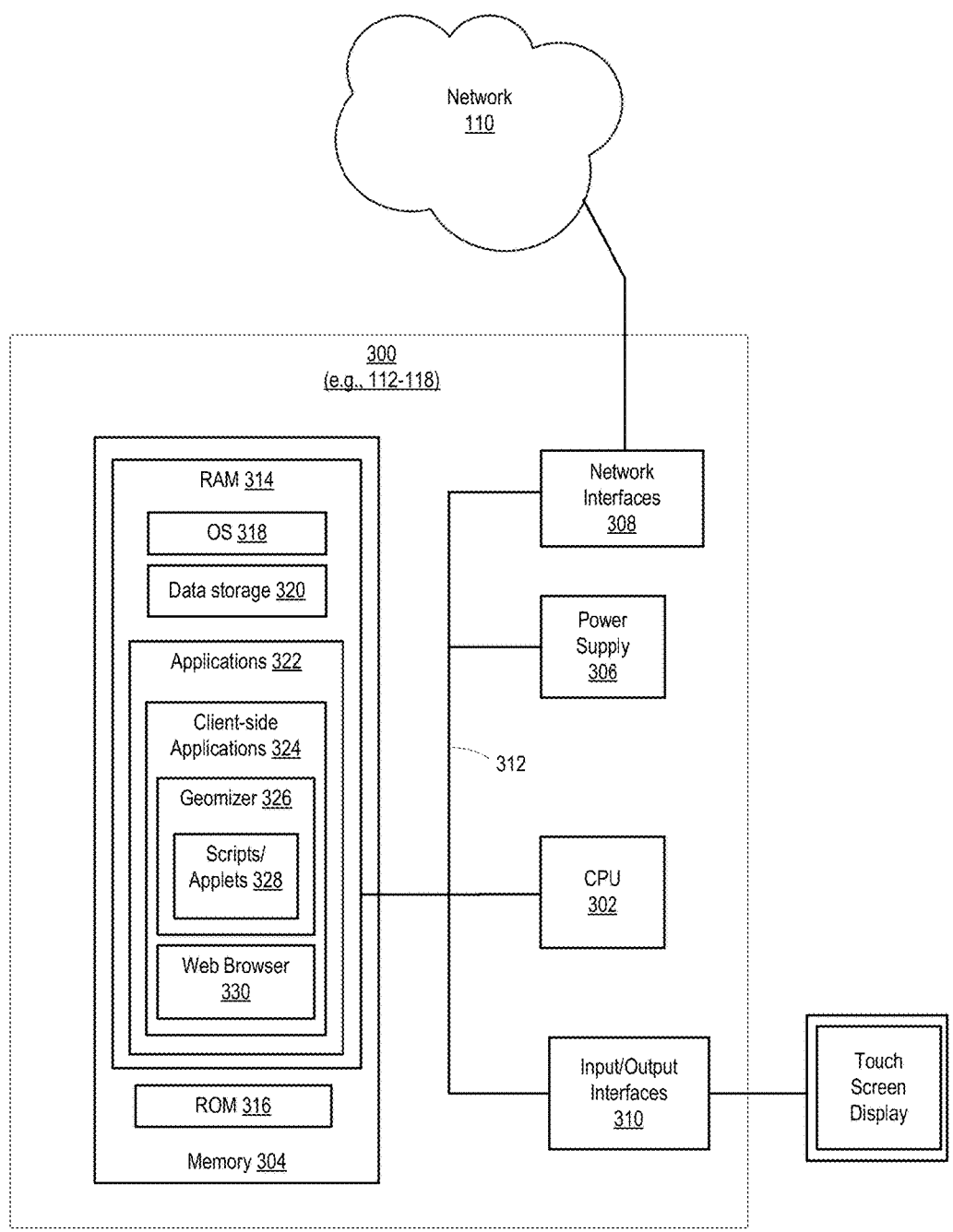

FIG. 3 illustrates an example computer 300 that can implement a client-side part of the geomizer, such as the client-side to the server-side of the geomizer 226 of FIG. 2. The computer 300 can include a central processing unit (CPU) 302, a memory circuit 304, a power supply circuit 306, and input/output circuits, such as network interfaces 308 and input/output interfaces 310, and a communication bus 312 that connects the aforementioned elements of the computer. The network interfaces 308 can include a receiver and a transmitter (or a transceiver), and an antenna for wireless communications. The CPU 302 can be any type of data processing device, such as a central processing unit (CPU). Also, for example, the CPU 302 can be central processing logic; central processing logic may include hardware (such as circuits and/or microprocessors), firmware, software and/or combinations of each to perform functions or actions, and/or to cause a function or action from another circuit of the computer 300. Also, central processing logic may include a software controlled microprocessor, discrete logic such as an application specific integrated circuit (ASIC), a programmable/programmed logic device, memory device containing instructions, a combinational logic embodied in hardware, or any combination thereof. Also, logic may also be fully embodied as software.

The memory circuit 304, which can include random access memory (RAM) 314 or read-only memory (ROM) 316, can be enabled by memory hardware, such as a primary (directly accessible by the CPU) and/or a secondary (indirectly accessible by the CPU) storage device (such as flash memory, magnetic disk, optical disk).

The RAM 314 can store data and instructions defining an operating system 318, data storage 320, and applications 322, including client-side applications such as A client-side part of the geomizer 326. The client-side part of the geomizer 326 can include sub-applications such as corresponding scripts/applets 328. Also, the client-side part of the geomizer 326 may be implemented through a web browser 330. Each of these sub-applications may be implemented via circuits. The circuits may be combined with the scripts and/or applets 328. The applications 322 and sub-applications may include hardware (such as circuits and/or microprocessors), firmware, software, or any combination thereof. Example information provided by an application, such as the client-side part of the geomizer 326, may include text, images, audio, video, or any combination thereof, which may be processed in the form of physical signals, such as electrical signals, for example, or may be stored in memory, as physical states.

The ROM 316 can include basic input/output system (BIOS) of the computer 300. The power supply 306 contains power components, and facilitates supply and management of power to the computer 300. The input/output circuits can include various types of interfaces for facilitating communication between components of the computer 300, components of external computers (such as components of other computers of the computer network architecture 100), and end users. For example, such circuits can include a network card that is an integration of a receiver, a transmitter, and I/O interfaces. The network interfaces 308 may include a network card. A network card, for example, can facilitate wired or wireless communication with other computers and network devices of a network. In cases of wireless communication, an antenna can facilitate such communication. The I/O components, such as I/O interfaces 310, can include user interfaces such as monitors, keyboards, touchscreens, microphones, and speakers.

Figure 4:
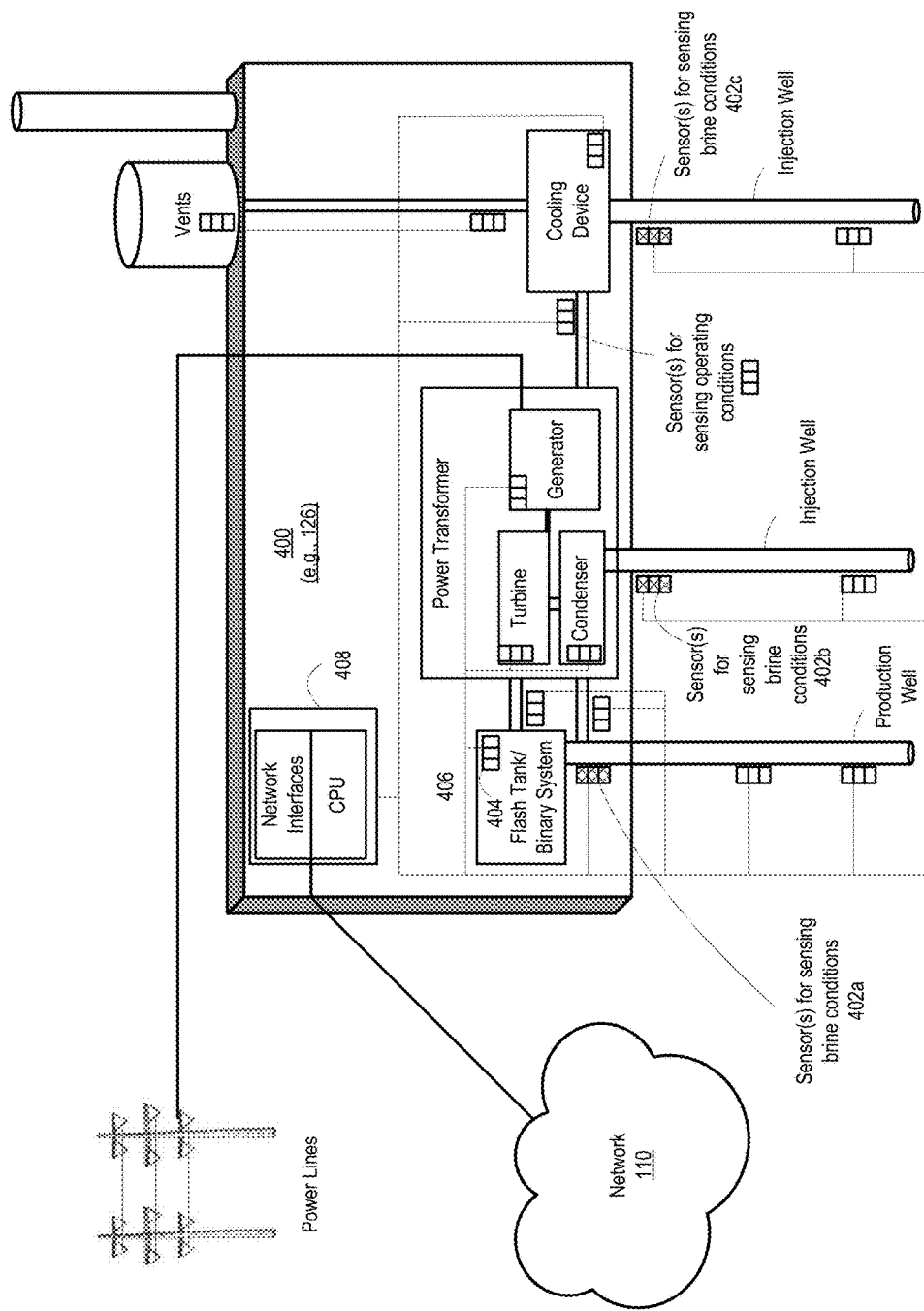
FIG. 4 illustrates an example geothermal power plant having at least one computer communicatively coupled to the computer network architecture 100 of FIG. 1.

Regarding FIG. 1, the depicted power plants, such as the dry steam geothermal power plant 120, the flash geothermal power plant 122, the binary geothermal power plant 124, and the combined geothermal power plant 126 (which can be any combination of the aforementioned geothermal power plants), each may include at least one computer and a network of sensors. The at least one computer may provide an interface between the network of sensors and other computers of the computer network architecture 100. FIG. 4 illustrates, in more detail, a combined geothermal power plant such as the combined geothermal power plant 126.

In the dry steam geothermal power plant 120, steam is produced directly from the geothermal reservoir to run a turbine to power an electrical power generator. In such a plant, there is no separation process to separate steam from the well brine. In the flash geothermal power plant 122, geothermally heated water under high pressure is sent to a steam separator that maintains a lower pressure to separate the steam (gas) and brine. The steam is delivered to the turbine whereas the liquid can be injected back into a reservoir. In the binary geothermal power plant 124, the supply water is usually below 150° C. Geothermal water (also known as geothermal fluid) is used to heat a secondary liquid (also known as working fluid) that boils under a lower temperature than water. The geothermal fluid and the working fluid are kept completely separate, which is also known as an indirect heat exchange. The working fluid expands into a gaseous vapor to drive a turbine in place of steam. The used brine of the geothermal fluid can be injected back into a reservoir. The combined geothermal power plant 126, such as a flash and binary combined power plant, can combine any of the aforementioned operations to achieve maximum efficiency and power output. The flash and binary combined power plant combines the benefits of both flash and binary geothermal processes. The portion of the geothermal water that flashes to steam under reduced pressure is used to generate electrical power. Additionally, the remaining hot brine and possible condensate is used to heat a separate loop to drive a secondary turbine via the binary process.

FIG. 4 illustrates an example geothermal power plant 400 ("the plant 400"), such as the combined geothermal power plant 126 of FIG. 1. The plant 400 includes a production well connected to a flash tank and/or a binary system. In some examples, there may more than one production well that feeds into the flash tank or binary system. In such examples, there may be are part prior to the flash tank that mixes the brines from the multiple production wells. In FIG. 1, the flash tank is connected to a geothermal power transformer, which includes a turbine, a condenser, and a generator. The generator is connected to power lines for delivery of electrical power generated by the generator. The geothermal power transformer is connected to a respective injection well. The geothermal power transformer is also connected to a cooling device. The cooling device is connected to a respective injection well and vents.

The plant 400 also includes a network of sensors. The network of sensors includes a communications circuit 406, which connects all the sensors of the network to a computer 408 that includes at least a central processing unit and network interfaces. The network of sensors can include sensors for sensing brine conditions. The brine conditions may include temperature of the brine, pressure of the brine, contents of the brine, acidity of the brine, or any combination thereof at a given location of the power plant. For example, sensors 402a can sense brine conditions immediately downstream of the flash tank. Sensors 402b can sense brine conditions at a head of the injection well connected to the power transformer. Sensors 402c can sense brine conditions at a head of the injection well connect to the cooling device. The network of sensors can also include sensors for sensing other operating conditions of the plant 400. For example, sensors 404 can sense thermodynamic conditions of the flash tank and/or the binary system. As depicted sensors for sensing other operating conditions, such as other thermodynamic conditions, can reside at various locations of the plant 400, including locations at a binary system, the power transformer, the turbine, the condenser, the generator, the cooling device, the production and injection wells, the vents, and connections between the aforementioned parts of the plant.

The computer 408 via its CPU and other circuits can receive and process data associated with the sensed conditions sensed by the various sensors of the network of sensors. After the data is processed, it can be communicated to other computers via the network interfaces of the computer 408 and the network 110 of FIG. 1. The computer 408 can be capable of sending or receiving signals, such as via a wired or wireless network, and/or may be capable of processing or storing signals, such as in memory as physical memory states, and may operate as a server. The computer 408 may be one of a set of computers including dedicated rack-mounted servers, desktop computers, laptop computers, set top boxes, integrated devices combining various features, such as two or more features of the foregoing devices, and any combination thereof. Besides a CPU, the computer 408 may also include at least one memory circuit.

Figure 5:
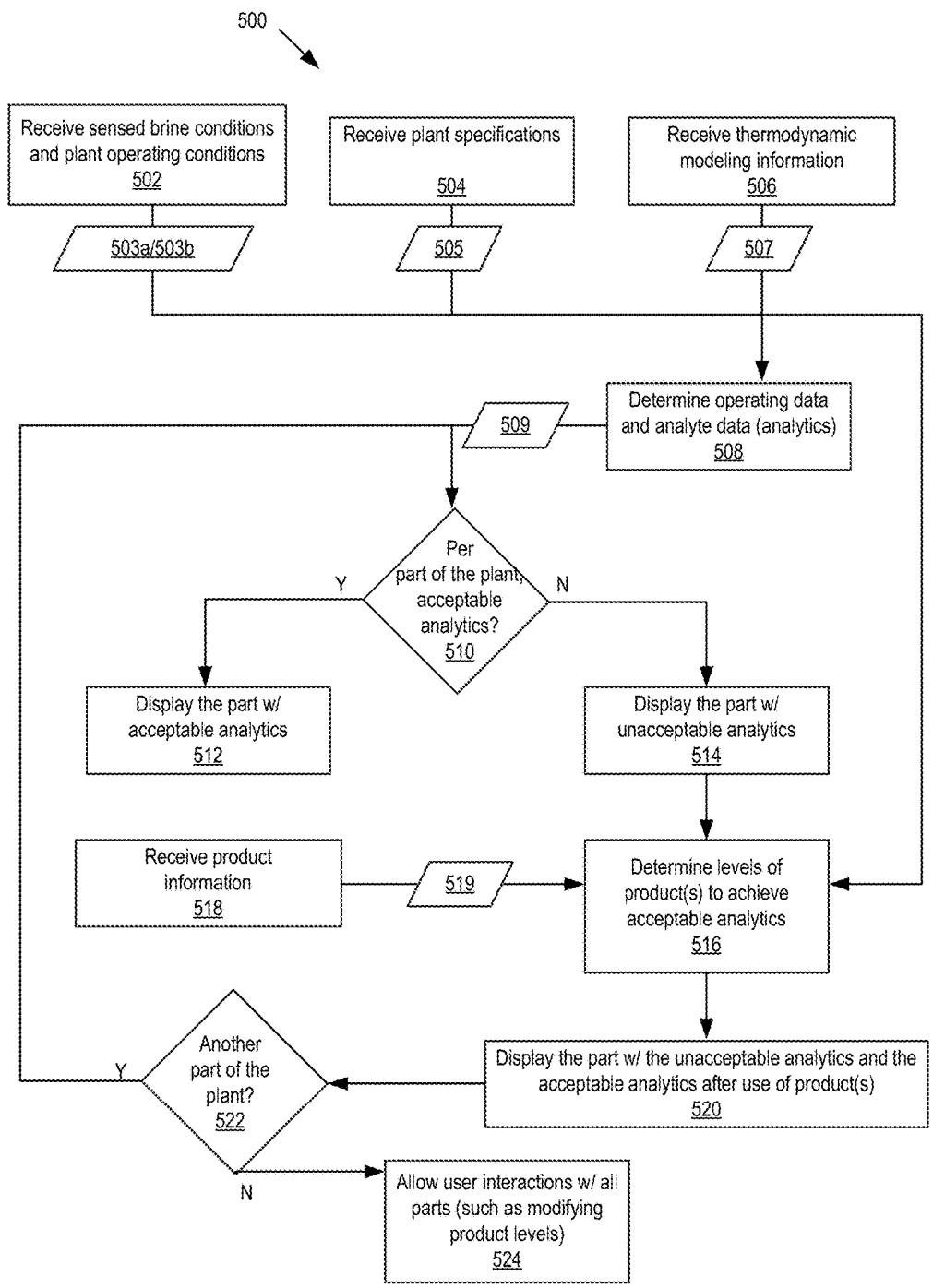
FIGS. 5 and 6 are flow diagrams of example operations that can be performed by example computers and other devices within the example computer network architecture 100 of FIG. 1. Also.

FIG. 5 illustrates example operations 500 performed by various circuits of the example computers of the computer network architecture 100 of FIG. 1. In one example, the geomizer server 102, at a receiver, can receive information including sensed brine conditions and other plant operating conditions, at 502. The sensed brine conditions can be communicated from a communications interface of a computer of a geothermal power plant, such as the computer 408 of FIG. 4. These sensed conditions can be sensed by sensors of the network of sensors in FIG. 4. The sensed brine conditions 503a can include pressure, temperature, acidity, and/or composition of the sensed brine. The other sensed conditions 503b can include thermodynamic conditions (such as solubility of minerals and other brine states at various pressures and temperatures).

Besides sensed brine conditions and other plant operating conditions, the geomizer server 102, at a receiver, can also receive information pertaining to specifications of the corresponding plant, at 504. The specifications 505 of the geothermal power plant can specify the type of plant, such whether it is a dry steam, flash, binary, or combination plant. The specifications can also specify the amounts of parts in the geothermal power plant and their arrangement within the plant, such as the amounts and arrangement of production and injection wells, flash tanks, turbines, condensers, generators, power transformers, cooling devices, and vents. The specifications can also include products used to maintain various operating conditions at the various parts of the geothermal power plant. Such products may include corrosion inhibitors, mineral scaling inhibitors (such as silica inhibitors and calcite inhibitors), and organic buildup inhibitors (such as various biocides). The specifications of the power plant can be communicated from a communications interface of a computer of a geothermal power plant, such as the computer 408 of FIG. 4. Also, the specifications can be communicated from the account server 108 and/or the service provider server 106 of FIG. 1.

Also, at 506, the geomizer server 102, at a receiver, can receive thermodynamic modeling information 507. The thermodynamic modeling information may include behavior of minerals and gases for ranges and specific temperatures, pH levels, and pressures that cover various operating limits at different parts of a power plant. The thermodynamic modeling information can be communicated from the thermodynamic model server 104 of FIG. 1.

At 508, one or more operating conditions calculator circuits of the geomizer, such as operating conditions calculators 232 of the geomizer 226 of FIG. 2, can determine operating condition values and analyte values according to the sensed operating conditions 503a and 503b, the plant specifications 505, and the thermodynamic modeling information 507. For example, analyte values can be determined according to the sensed brined conditions 503a and/or the plant specifications 505 inputted into a thermodynamic model of the thermodynamic modeling information 507. In one example, an analyte value may be a percentage of one or more minerals in the brine. There may be an analyte value for one mineral or a combination of minerals in the brine. In other examples, analyte values may be concentrations of one or more minerals, molecules, organic and/or inorganic materials, or any combination thereof.

At 510, per part of the power plant, the geomizer can determine whether the corresponding analyte values and/or the operating condition values ("analytics") 509 are acceptable. At 512, via processing and rendering by the geothermal plant modeler 230 of FIG. 2, for example, a display device can display the part of the power plant along with the acceptable analytics for that part, where the geomizer determined the analytics for that part are acceptable. Where the geomizer determined the analytics for a part are unacceptable, at 514, via processing and rendering by the geothermal plant modeler 230 of FIG. 2, for example, a display device can display the part of the power plant along with the unacceptable analytics for that part. In one example, unacceptable analytics standout from acceptable analytics, such as by various alternatives for emphasizing graphical elements on a display. The alternatives may include highlighting, bolding, italicizing, and/or enlarging the graphical elements that represent the unacceptable analytics. This functionality may assist a sales person in selling products and services to remedy the unacceptable results.

At 516, the geomizer, via at least one of the operation condition calculator circuits, can determine one or more levels of one or more products that could be added to the part of the power plant to achieve acceptable analytics. This determination at 516 can be according to product information 519, received by the geomizer server 102 and sent from the service provider server 106, for example, at 518, and the sensed operating conditions 503a and 503b, the plant specifications 505, the thermodynamic modeling information 507, or any combination thereof. At 518, via processing and rendering by the geothermal plant modeler 230 of FIG. 2, for example, the display device can display the part of the power plant along with the acceptable analytics for that part after proposed use of the determined level(s) of product(s) to add to that part. This information can also be displayed along with the level(s) of product(s) and the unacceptable analytics, at 520. In one example, this information is displayed after initially displaying just the unacceptable analytics. This order of display can possibly enhance the sales experience.

The aforementioned operations are repeated until each part of a geothermal power plant is displayed with acceptable analytics and/or unacceptable analytics. At 522, the geomizer determines whether another part needs to be analyzed according to the plant specifications 505. At 524, once all the parts are displayed, the user interface of the geomizer, can allow end users to adjust various aspects of the displayed graphical elements. For example, user may adjust levels of product and even try alternative products. Also, users may add and remove other displayed items such as parts of the plant. In some examples, upon interaction with the graphical parts, the corresponding analytics can update in real time.

In one example, historical sensed operating conditions used to determine historical analytics via the thermodynamic modeling information can be compared to real-time analytics determined from real-time sensed conditions to determine the accuracy of the thermodynamic modeling information. These accuracy finding can be used to update the thermodynamic modeling information.

Figure 6:
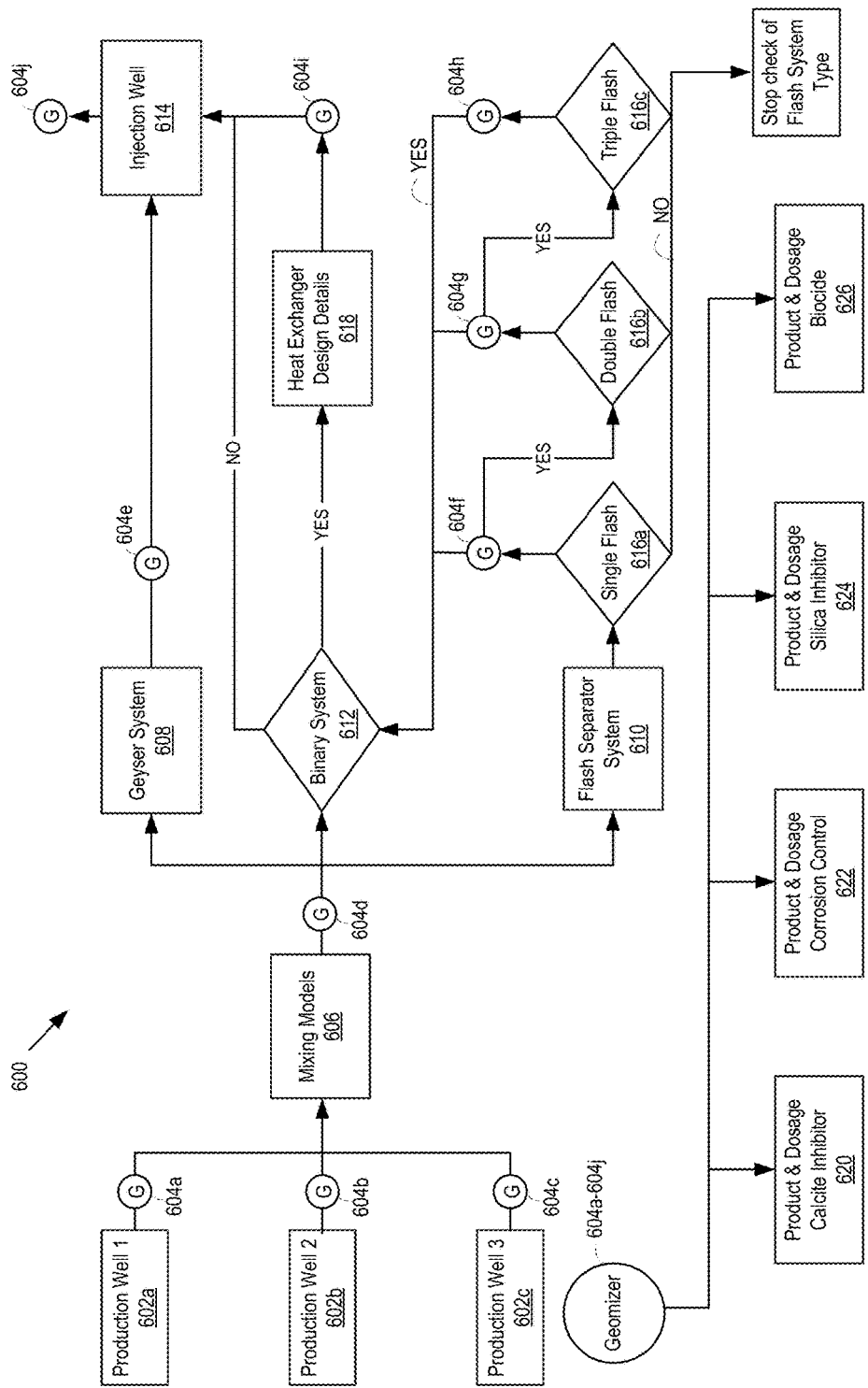

FIG. 6 illustrates alternative or additional example operations 600 performed by various circuits of the example computers of the computer network architecture 100 of FIG. 1. At 602a, 602b, and 602c respective operating conditions, such as respective brine conditions, are sensed by respective sensors at three respective productions wells. The geomizer then uses the sensed conditions to determine respective analyte values 604a, 604b, and 604c for each of the three respective wells. In the case of sensing brine conditions at each well, the sensing can occur at the head of each well. The head of each well is immediately prior to each well's connection with another part of the power plant, such as the flash tank or tank for mixing the brines from the multiple wells. The operating conditions, such as brine conditions, or the analytes are then analyzed according to mixing models, at 606. The output of this analysis is one or more analyte values 604d representing mixtures of brines from the multiple wells. For example, one or more analyte values may be determined according to the respective analyte values 604a, 604b, and 604c and the mixing models. Alternatively, brine conditions may be sensed at the mixing tank, such as at the head of the mixing tank where mixing of the brines should be completed. These brine conditions sensed at the mixing tank can also be used to determine the one or more analyte values 604d. Further, the one or more analyte values 604d resulting from the alternative methods can be used to check the accuracy of the alternative methods.

The one or more analyte values 604d are then further analyzed according to the type of geothermal plant corresponding to the wells. Alternatively, where there may be one production well, the one or more analytes are determined according to the sensed brine conditions at the head of the one well and the type of geothermal plant corresponding to that well. In one example, it is determined whether the plant is binary or flash, single flash or multiple stage flash, and combined binary and flash. These determinations may be made according to information received from a computer at the power plant, such as computer 408. A receiver of the geomizer may receive the information pertaining to the brine conditions and the type of power plant. The type of power plant can be determined according to the plant's features, such as whether the plant includes one or more binary systems or flash tanks. An analyte calculator circuit communicatively coupled to the receiver can determine the one or more analyte values at each phase of the operations 600.

At 608, the analyte values are analyzed and changed according to a geyser system model. This determination outputs geyser system analyte values 604e.

At 610, the analyte values are analyzed and changed according to a flash separator system model. This determination outputs flash separator system analyte values 604f, 604g, and 604h, for example. At 616a, the geomizer can determine whether the flash system is a single flash system, and this determination outputs flash separator system analyte values 604f. At 616b, the geomizer can determine whether the flash system is a double flash system, and this determination outputs flash separator system analyte values 604g. At 616c, the geomizer can determine whether the flash system is a triple flash system, and this determination outputs flash separator system analyte values 604h.

At 612, the analyte values are analyzed and changed according to a binary system model. Where it is determined that the geothermal system is a binary system, the analyte values are further analyzed and changed according to heat exchanger design details, at 618. This determination outputs heater exchanger analyte values 604i.

At 614, the analyte values 604d-604i are determined by the geomizer with respect to one or more injection wells (such as at respective heads of the one or more injection wells). From this determination the geomizer outputs injection well analyte values 604j. This occurs subsequent to the analyte values being further processed according to whether the respective geothermal system is a geyser system, a flash separator system, or a binary system.

At 620, any of the analyte values 604a-604j can be inputted into a product dosage circuit of the geomizer to determine the product and dosage of that product for acceptable calcite buildup prevention at different parts of the given power plant. At 622, any of the analyte values 604a-604j can be inputted into the product dosage circuit of the geomizer to determine the product and dosage of that product for acceptable corrosion prevention at different parts of the given power plant. At 624, any of the analyte values 604a-604j can be inputted into the product dosage circuit of the geomizer to determine the product and dosage of that product for acceptable silica buildup prevention at different parts of the given power plant. At 626, any of the analyte values 604a-604j can be inputted into the product dosage circuit of the geomizer to determine the product and dosage of that product for acceptable organic material buildup prevention at different parts of the given power plant, such as determination of biocide and dosage of that biocide. The acceptable buildup and corrosion preventions can be predetermined according to historical power plant data of geothermal power plants in general or the specific power plant being analyzed by the operations of FIG. 6. The historical power plant data may include historical data on various thermodynamic conditions, such as time, temperature, and pressure, and the results of buildup and corrosion under those conditions. The output of 620-626 can be input for the determination at 516 in FIG. 5, where the geomizer determines one or more levels of one or more products that could be added to a part of the power plant to achieve acceptable analytics. At 516, this determination can be according to the product information 519, the sensed operating conditions 503a and 503b, the plant specifications 505, the thermodynamic modeling information 507, or any combination thereof.

Figure 8:
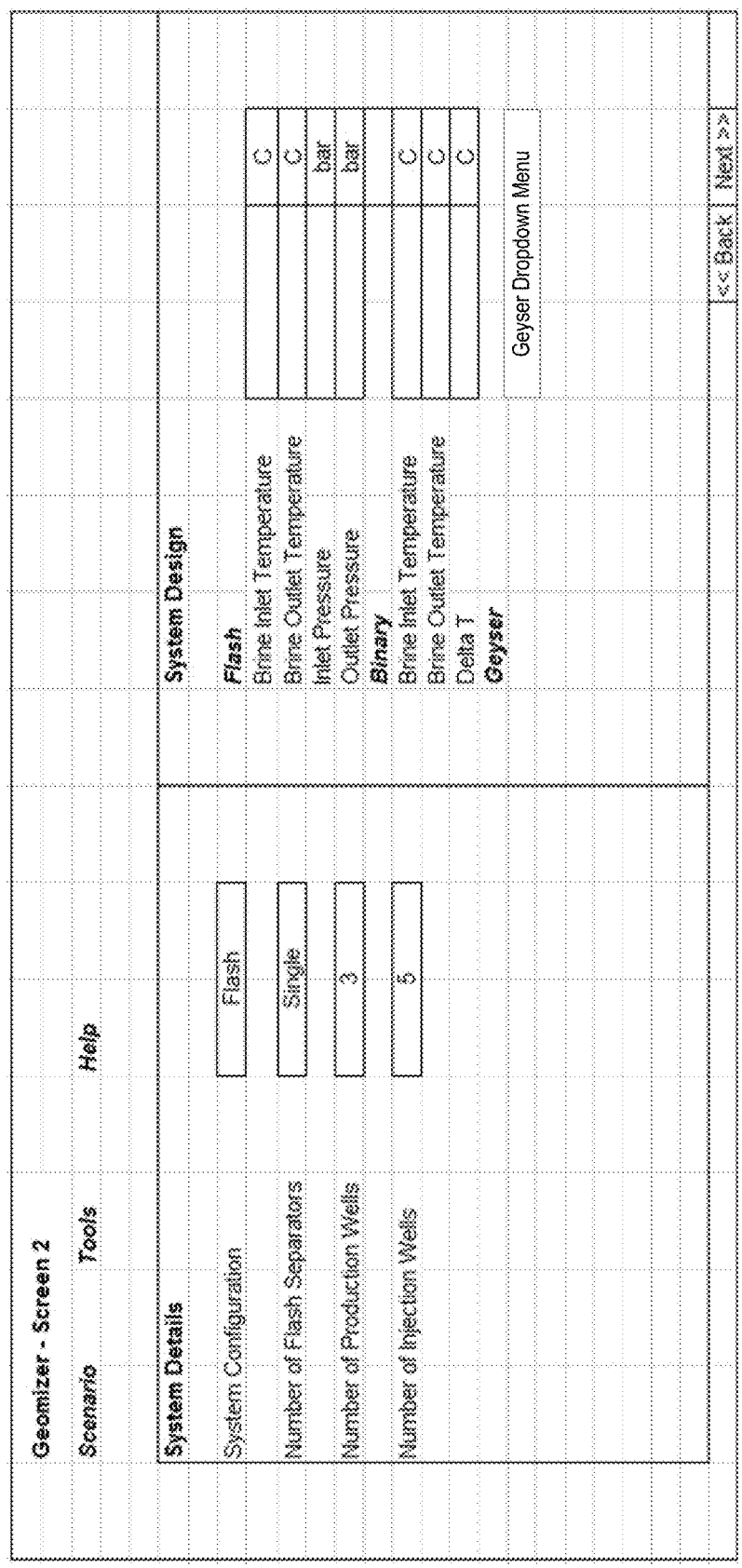

FIGS. 7-11 illustrate example screens for determining and providing optimization information for a geothermal power plant, such as one of the plants 120-126 of FIG. 1. These screens can provide a user interface for the operations illustrated in FIGS. 5 and 6. FIG. 7 depicts a screen of a front end of the geomizer that includes a user interface for entering information regarding an optimization project for a geothermal power plant (Geomizer—Screen 1). Depicted are input/output fields including fields for inputting and outputting a name of a project, a customer name for an operator of a geothermal power plant associated with the project, a location of the geothermal power plant, notes on analytics performed on the plant, date of the performed analytics, and who performed the analytics (such as which salesperson operating the geomizer requested the analytics). Also, depicted is a button labeled "next". When a user clicks the "next" button, the next screen of the front end of the geomizer appears (Geomizer—Screen 2). This next screen is depicted in FIG. 8.

In FIG. 8, depicted are input/output fields including fields for inputting and outputting configurations of the geothermal power plant, such as whether the power plant uses one or more production wells, flash separation processes, binary heat exchangers, geyser or dry steam systems, reinjection wells, and any combination thereof. Also depicted are input/output fields including fields for inputting and outputting other features of the power plant, such as preferred brine inlet temperature, brine outlet temperature, inlet pressure, and outlet pressure, for flash separation systems. Also depicted are input/outfields for inputting and outputting design features for binary and geyser systems. Also, depicted are buttons labeled "next" and "back". When a user clicks the "next" button, the next screen of the front end of the geomizer appears (Geomizer—Screen 3). This next screen is depicted in FIG. 9. When a user clicks the "back" button, the previous screen appears (Geomizer—Screen 1).

Figure 10:
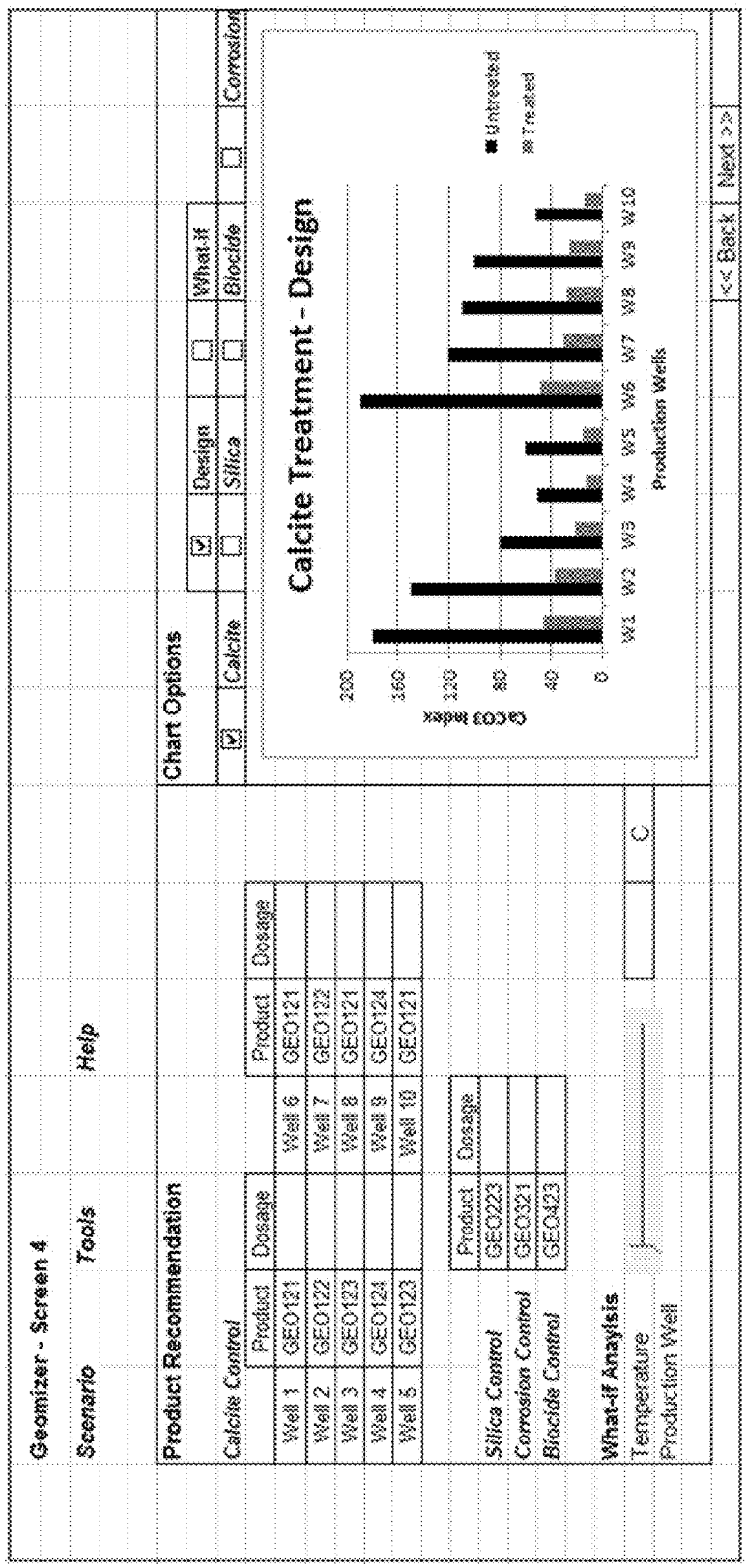

In FIG. 9, depicted are input/output fields including fields for inputting and outputting information per well of the geothermal power plant, such as fields for inputting and outputting steam chemistry in a given well, brine chemistry in the well, the well's composite flow rate at a point in the well, the well's composite temperature at the point in the well, the well's composite pressure at the point in the well, and the well's composite acidity at the point in the well. Also, depicted are buttons labeled "next" and "back". When a user clicks the "next" button, the next screen of the front end of the geomizer appears (Geomizer—Screen 4). This next screen is depicted in FIG. 10. When a user clicks the "back" button, the previous screen appears (Geomizer—Screen 2).

Figure 11:
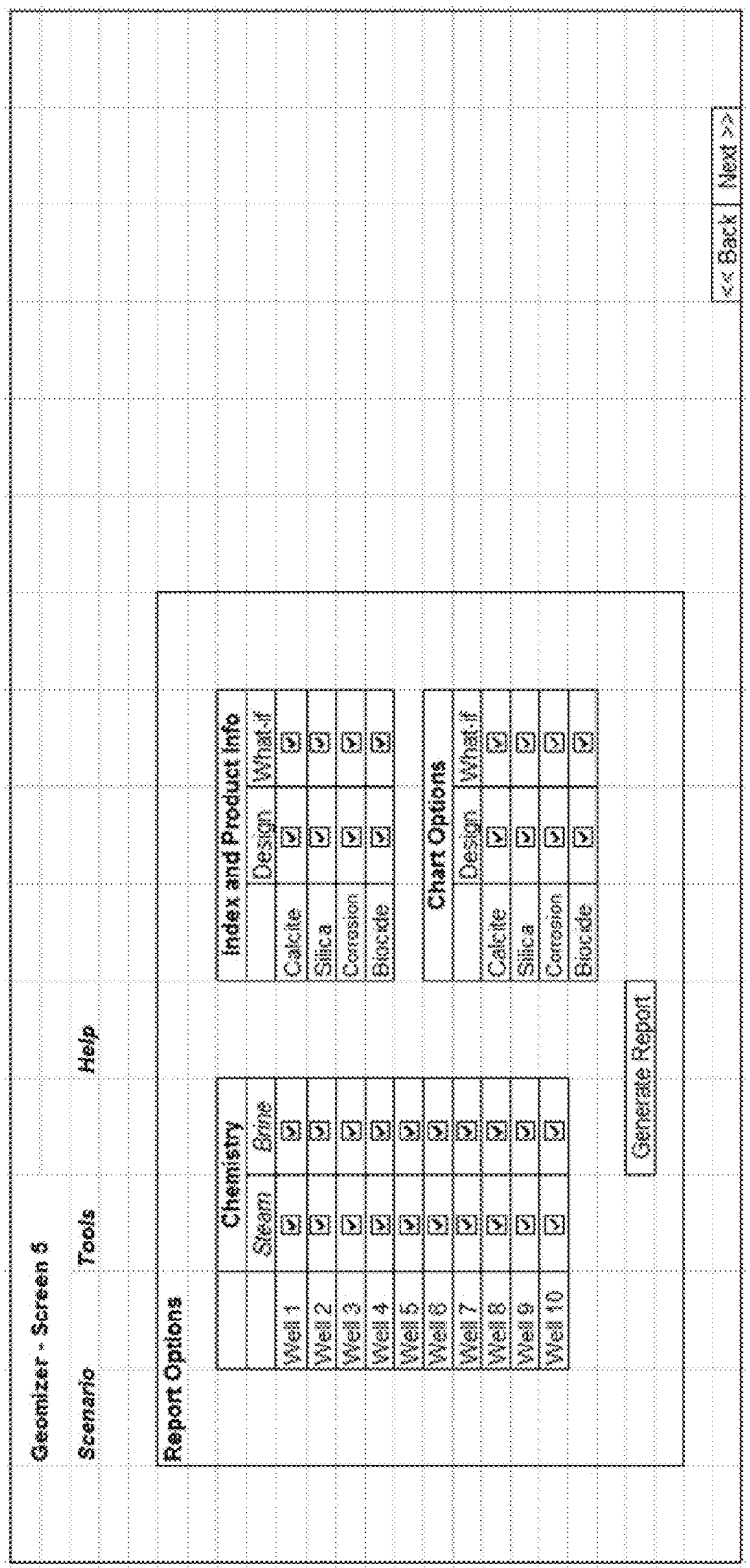

In FIG. 10, depicted are input/output fields including fields for inputting and outputting information per well of the geothermal power plant, such as fields for inputting various product dosage levels per well of the power plant, fields for inputting various product dosage levels for silica control, corrosion control, and biocide control, and fields for inputting possible temperatures per well. Using such inputs, the geomizer can output to this screen different treatment recommendations per well, such as calcite treatment recommendations, silica treatment recommendations, biocide recommendations, and corrosion control recommendations. Also, depicted are buttons labeled "next" and "back". When a user clicks the "next" button, the next screen of the front end of the geomizer appears (Geomizer—Screen 5). This next screen is depicted in FIG. 11. When a user clicks the "back" button, the previous screen appears (Geomizer—Screen 3).

In FIG. 11, depicted are input/output fields including fields for generating reports regarding historical and predicted steam chemistry and brine chemistry, and predictions of plant operations given product dosage levels. Also, depicted are buttons labeled "next" and "back". When a user clicks the "back" button, the previous screen appears (Geomizer—Screen 4). When a user clicks the "next" button, a new screen may appear, such a screen providing a unit converter. The new screen may also include an illustration of the geothermal power plant with configurations and conditions of the plant (such as scaling, organic buildup, and corrosion data in real time according to user selected power plant configurations) shown at respective parts of the illustrated plant.

The invention claimed is:

1. A method comprising:
   receiving, at a receiver, first brine conditions sensed at a first part of a geothermal power plant;
   receiving, at the receiver, second brine conditions sensed at a second part of the geothermal power plant;
   determining, at a first circuit, a first analyte value according to the first sensed brine conditions;
   determining, at the first circuit, a second analyte value according to the second sensed brine conditions;
   determining, at a second circuit, a first product dosage value for a first product according the first analyte value and product information, the first product dosage value being an amount of the first product suggested to adequately prevent buildup, corrosion, or a combination thereof at the first part of the power plant, according to historical power plant data; and
   determining, at the second circuit, a second product dosage value for a second product according the second analyte value and the product information, the second product dosage value being an amount of the second product suggested to adequately prevent buildup, corrosion, or a combination thereof at the second part of the power plant, according to the historical power plant data.

2. The method of claim 1, further comprising: displaying, at a display device, the first and the second product dosage values along with graphical representations of the first and the second parts of the power plant.

3. The method of claim 1, wherein the first part is a head of a first production well and the second part is a head of a second production well.

4. The method of claim 1, wherein the first part is a head of a production well and the second part is a head of a brine mixing tank, a head of a flash tank, a head of a geothermal fluid pipe in a binary system, or a head of a working fluid pipe in the binary system.

5. The method of claim 1, wherein the first product and the second product are similar products.

6. The method of claim 1, wherein the first brine conditions and the second brine conditions include brine temperature, brine pressure, brine contents, or any combination thereof.

7. The method of claim 1, wherein the first analyte value and the second analyte value are representative of concentrations of one or more minerals, molecules, materials, or any combination thereof.

8. The method of claim 1, wherein the first product and the second product include a calcite inhibitor, an anhydrite inhibitor, a silica inhibitor, a fluorite inhibitor, any other type of mineral inhibitor, a biocide, a corrosion inhibitor, or any combination thereof.

* * * * *